United States Patent [19]

Drefko et al.

[11] 4,357,711

[45] Nov. 2, 1982

[54] TWO WAY RADIO SAFETY HELMET

[76] Inventors: Joseph Drefko, c/o George Spector, 3615 Woolworth Bldg. 233 Broadway; George Spector, 3615 Woolworth Bldg., 233 Broadway, both of New York, N.Y. 10007

[21] Appl. No.: 229,765

[22] Filed: Jan. 29, 1981

[51] Int. Cl.³ .............................................. H04B 1/38
[52] U.S. Cl. ........................................ 455/89; 455/90; 455/351
[58] Field of Search ............... 455/89, 90, 351, 95, 455/128; 179/156 R; 2/422–425

[56] References Cited

U.S. PATENT DOCUMENTS

| | | | |
|---|---|---|---|
| 3,239,842 | 3/1966 | Marcello | 2/423 |
| 3,430,261 | 3/1969 | Benner | 179/156 |
| 3,822,698 | 7/1974 | Guy | 2/424 |
| 3,889,190 | 6/1975 | Palmer | 455/89 |

FOREIGN PATENT DOCUMENTS

| | | | |
|---|---|---|---|
| 740988 | 8/1966 | Canada | 455/90 |
| 936921 | 11/1973 | Canada | 455/90 |
| 2384422 | 11/1978 | France | 2/422 |

*Primary Examiner*—Jin F. Ng

[57] ABSTRACT

A 43 channel citizens band radio motorcycle safety helmet, including a helmet shell having a removable front windshield, and containing a C.B. radio, a pair of earphones, a microphone and a control console, the earphones being selectively movable in position so to allow exterior sounds pass through helmet side holes to the ears.

3 Claims, 5 Drawing Figures

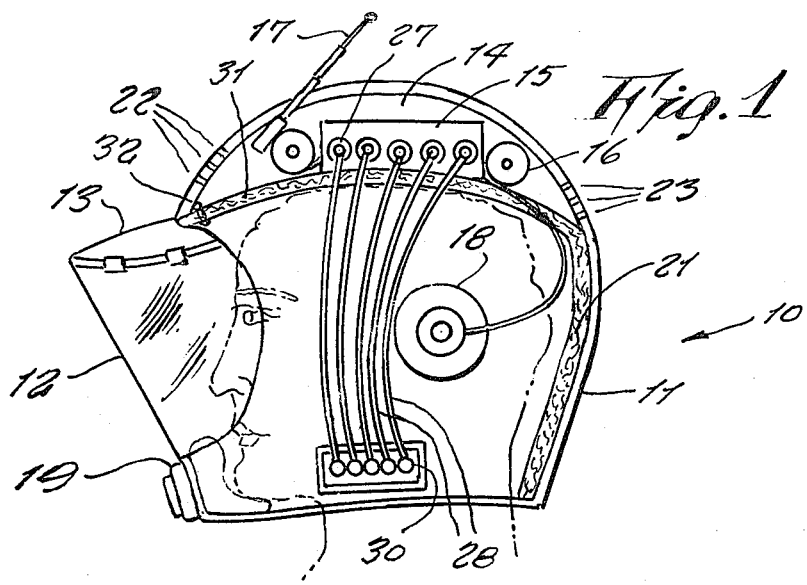
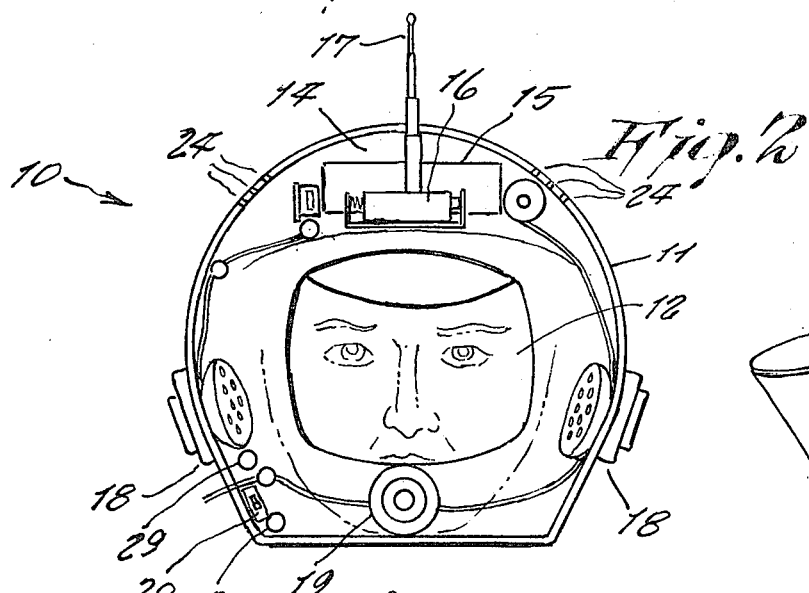
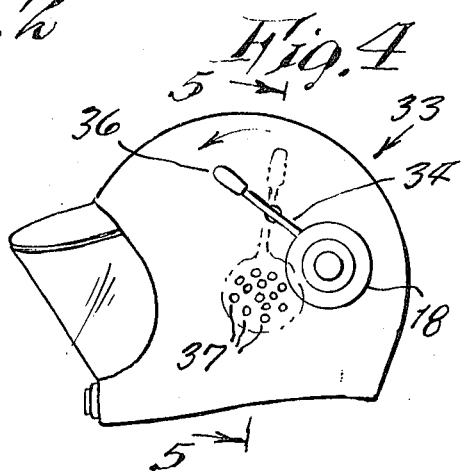
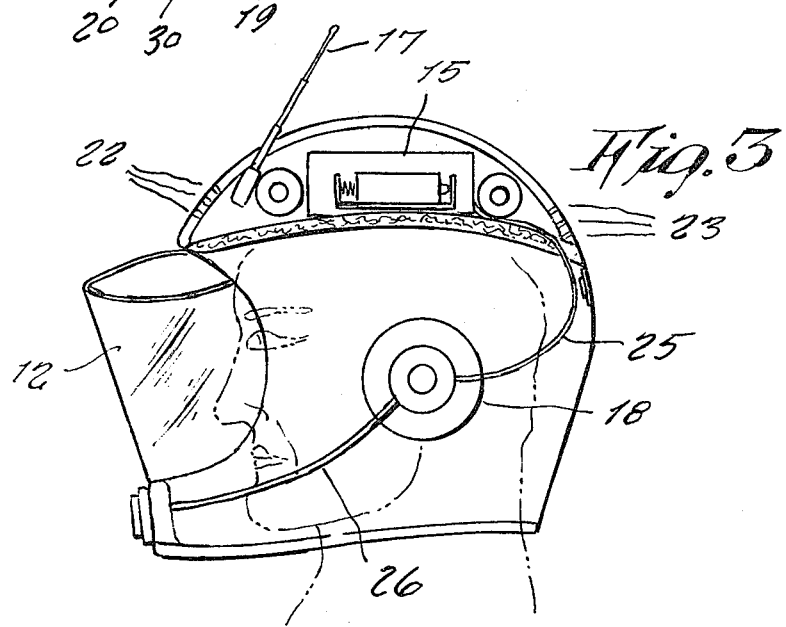
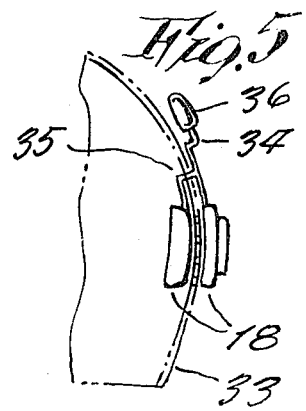

TWO WAY RADIO SAFETY HELMET

This invention relates generally to motorcyclist helmets.

A principal object of the present invention is to provide a citizens band 43 channel radio that is unlike any other two-way radio incorporated heretofore in a motorcyclist's helmet, but also being able to monitor all trucks, cars or other vehicles that are equipped with the C.B. radio, in order to provide assistance where needed, or receive assistance therefrom if they themselves need it.

In the drawing:

FIG. 1 is a side view of the invention showing a portion of the viewed side broken away so to illustrate the interior structure.

FIG. 2 is a front view thereof.

FIG. 3 shows a high impact plexiglass shield clips for easy C.B. radio servicing.

FIG. 4 is a side view showing an additional design wherein selectively the earphones are sidewardly pivotable so to clear openings in a side of the helmet so to allow hearing sound outside.

FIG. 5 is a view in direction 5—5 of FIG. 4.

Referring now to the drawing in greater detail, and more particularly to FIGS. 1 and 2 thereof, at this time, the reference numberal 10 represents a two way radio Safety Helmet, according to the present invention, wherein there is a hollow helmet shell 11 made from a high impact fibreglass, non-conductive material for safety and protection of the wearer. A removable, tinted windshield 12, when attached, is a comfortable protection means from the elements such as rain, hail, snow and wind, as well as flying stones or other objects on a street, highway, expressway or country trail, wherever a motorcycle may go.

When the windshield is removed, a high impact peak 13 remains intact on the shield, so to give protection to the wearer's eyes and face.

The interior of the helmet shell has a sealed off area 14, above the wearer's head, consealing a 43 channel citizen band radio 15 together with a battery pack 16 and an antenna 17 protruding outwardly of the shell; the antenna being retractable or extendable up to twenty-four inches above the helmet for a maximum optimum of reception performance.

The receiver earphones 18 are fixedly secured, as a part of the helmet shell and are provided for each ear to receive sound from the citizen's band (C.B.) radio.

A microphone 19 also is made fixedly as part of the helmet shell, and is located at the front thereof in alignment with the wearer's mouth, so to be always in position for receiving commands therefrom and send them out. The microphone has automatic "off" "on" sound controls for sending messages or for listening. Once the radio switch 20 is turned on, the sound-controlled microphone automatically controls the sending and receiving of sounds, as if the set had a special push-to-talk button and release-to-listen button.

A safety padding 21, of approximately one inch thickness, lines the inner side of the shell, and provides comfort and safety to the motorcyclist in case of an accident while traveling, and preventing injury.

Grooves 22,23 and 24 are located in groups through various parts of the shell for the purpose of ventilation to the C.B. radio, and maintain it in a cool operating condition for maximum performance.

All the electrical wiring 25 and 26 is plastic-sheathed inside the helmet shell, in order to prevent any short circuiting.

The radio control knobs 27 on the radio are interconnected with control knobs on controls 30 non-expanding and non-contracting cables 28 running around pulleys 29 (shown only in FIG. 2), so to give instant channel changing control, as if each knob 27 on the console 30 were a part of the radio itself.

Control consol 30 is indented into the lower right side or left side of the shell 11 thus favoring either a left handed or right handed person, as preferred. A cover which closed down over the consol, is activated by a push-to-open or push-to-close type of mechanism and is spring-loaded for such operation.

In FIG. 1, a high impact plexiglass shield 31 is clipped in place within the upper portion of the helmet shell, using a specially designed clip 32, so to be readily unclipped when needed in order to provide easy access for servicing the C.B. radio.

In operative use, when a motorcyclist, wearing the helmet 10, wishes to turn on the C.B. radio, he or she may do so with ease, even when traveling at maximum speed limits.

The helmet 33, shown in FIGS. 4 and 5, may be made a same as above-described, but it additionally includes a means whereby the receiver earphones 18 are manually pivotable out of a way in order to allow a wearer to hear sounds directly outside of the helmet, such as when conversing with others without removing the helmet, or listening for emergency vehicle sireens while travelling. The earphones are each mounted on an end of a lever 34 pivotable about a pivot 35 provided on the helmet, and an opposite end of the lever, located externally, serves as a handle 36 for manually swinging the earphones either out of a way or in alignment with sound holes 37 through the shell.

What is claimed as new, is:

1. A two-way radio motorcycle safety helmet, comprising in combination, a hollow shell, a removable windshield at a front of said shell, a peak over said windshield, a padding lining an inner side of said shell, and a radio system inside said shell wherein said system includes a two way radio in an upper part of said shell, an earphone at each side, a microphone at a front and a control console at a side of said shell, said console and radio having control knobs interconnected by cables whereby said radio is controlled by adjustment of said console knobs.

2. The combination as set forth in claim 1 wherein said earphones are movably mounted for selectively exposing side holes in said shell for exterior sound to pass therethrough, in combination with means for moving said earphones comprising an external lever mounted on a pivot extending through said shell and connected to said earphones.

3. A safety helmet as in claim 2 wherein retractible antenna is mounted on said radio and extends through said helmet thereabove.

* * * * *